United States Patent
Rougier (10) Patent No.: US 10,116,475 B1
(45) Date of Patent: *Oct. 30, 2018

(54) AUTOMATIC ELECTRICAL SIGNAL DECODING DISCOVERY AND ELECTRICAL SIGNAL CODING BETWEEN A DEVICE AND ITS REMOTE CONTROLLER

(71) Applicant: KIRIO INC., Lynnwood, WA (US)

(72) Inventor: Franck D Rougier, Seattle, WA (US)

(73) Assignee: Kirio, Inc., Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,131

(22) Filed: Jul. 5, 2017

Related U.S. Application Data (63) Continuation of application No. 15/265,099, filed on Sep. 14, 2016, now Pat. No. 9,774,480.

(60) Provisional application No. 62/218,379, filed on Sep. 14, 2015.

(51) Int. Cl.
*H04B 3/00* (2006.01)
*H04L 27/00* (2006.01)

(52) U.S. Cl.
CPC ...... *H04L 27/0012* (2013.01); *H04L 27/0008* (2013.01); *H04L 27/0002* (2013.01)

(58) Field of Classification Search
CPC ............. H04L 27/0012; H04L 27/0008; H04L 27/0002
USPC ......................................................... 375/257
See application file for complete search history.

(56) References Cited

U.S. PATENT DOCUMENTS

2003/0053794 A1* 3/2003 Krouglov ............... G11B 20/02
 386/275
2010/0219808 A1* 9/2010 Steckley ............ G01R 19/2513
 324/76.77

* cited by examiner

*Primary Examiner* — Helene Tayong
(74) *Attorney, Agent, or Firm* — FSP LLC (57) ABSTRACT

A process for automatic electrical signal discovery and decoding includes detecting electrical disturbances in a serial or parallel bus, or from a transducer with a signal monitor and demodulating the signals by configuring a signal filter window on a frequency filter to maximize time domain signal resolution. Filtering out each frequency captured by the filter and adapting the signal filter window to increase frequency resolution until maximal frequency resolution is attained, demodulating the signal based on the detected encoding and transforming the demodulated signal into a binary code string for transcription to a channel code file.

19 Claims, 9 Drawing Sheets

AUTOMATIC ELECTRICAL SIGNAL DECODING DISCOVERY AND ELECTRICAL SIGNAL CODING BETWEEN A DEVICE AND ITS REMOTE CONTROLLER

BACKGROUND

Typical modulation/demodulation schemes start with foreknowledge of the intended use, the physical interconnect, and other system requirements. Because every manufacturer uses different approaches in their design, the market has multiple systems to communicate information from a device providing a useful function to its remote controller. Typical universal remote controllers simply record a visible spectra of information sent from a given controller then replay it. These are popular with optical systems such as infrared remote controls. With the advent of modern equipment, information is often exchanged prior to an operation between the device and the remote controller. Therefore, blindly recording the information is often not sufficient. In addition, because the information sent is parameterized (e.g. temperature settings), it is not feasible to emulate all variations of the parameters to arrive to all possible combinations.

In order to interface with such electrical systems, a true understanding of the underlying physical communication layer is necessary. In the past, most modulation/demodulation systems were focused on a given encoding scheme and multiple techniques for recovering the digital information were proposed. Most of these methods focused on Fourier transform analysis where the information was contained in the spectral analysis of the sinusoidal signal functions. These systems (mostly specialized ASICS) are pre-programmed for specific classes of signals to be modulated/demodulated following a specific standard. Because of their specificity, the encoding mechanisms are based on the Fast Fourier Transform (FFT) for demodulation and the Inverse Fast Fourier Transform (IFFT) for modulation, both discrete versions of the Fourier Transform (FT).

Using the Fourier Transform (FT), typical time-domain signals can be represented as a sum of sinusoidal functions in the spectral domain. However, the number of functions needed to represent any arbitrary signal including those with discontinuities is infinite (Gibbs phenomenon). Therefore, the Fourier coefficients are also infinite. In order for a decoding mechanism to apply to both continuous and non-continuous signals, it is necessary to preserve the frequency information as well as the temporal information of the signal. Due to the large constellation of points involved in decoding higher-order modulation schemes, more templates are required to properly detect the amplitude and phase changes. Thus, higher-order modulation schemes can require an enormous number of templates to be used when attempting to decode a signal. This is obviously very resource intensive and may be impractical for resource constrained applications.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"electric disturbance" in this context refers to a change in the voltage or current of an electrical signal;

"frequency filter" in this context refers to logic to filter out a frequency or frequencies;

"signal demodulator" in this context refers to a module which receives electrical signals and decodes them by applying a wavelet transform to the signal;

"signal filter window" in this context refers to logic to examine a portion of an electrical disturbance (signal), this logic may utilize a window function;

Description

This system and method allows the user to decode virtually any wired or wireless signal. The utilization of wavelet transforms and common-feature templates (templates) allow for the efficient analysis and decoding of signals which may not otherwise have been possible. The method described herein is applicable to many existing encoding mechanisms used between a remote control and a controlled device and allows for modulation and demodulation on both the software and hardware level. It is also possible to apply the method to future encoding mechanisms and can be understood as a flexible, dynamic and adaptive modem.

The system and method use a Wavelet Transform (WT) approach to modulate and demodulate unknown electrical communication signals. The principles of the Automatic Signal Discovery (ASD), modulation, decoding and subsequent encoding and WT noise reduction are well known in image processing and the same de-noising techniques can be used for electrical communication systems. However, it may be important to note that because the noise is distributed uniformly across all wavelet coefficients, a linear method will yield better signal data preservation. Corruption detection using the present method is possible but if the initial sampled data is corrupted, de-noising may yield degraded information during Automatic Signal Discovery.

For wireless systems, in order to improve the ASD, further signal processing and conditioning are required. A mathematical understanding on how the signal is propagating from the transmitter to the receiver, allows the receiving system to adapt to the transmission conditions. Further, minimizing or cancelling effect of group and phase delay between different frequency components is a typical pre-processing step done for wireless systems.

In the present system and method, the Automatic Signal Discovery process is based on a Continuous Wavelet Transform of a digitally modulated signal with an unknown modulation scheme. This signal is an input to a receiver (a device) generated from a remote control, or vice-versa. This CWT is then cross-correlated to a set of Wavelet Domain (WD) common-feature templates which may have previously been generated.

Generally, wavelets are purposefully crafted to have specific properties that make them useful for signal processing. The Wavelet Transform has been applied to identify a wide ranges of signals spanning multiple fields. Typically, using feature specific templates, the wavelet coefficients of a given signal are plotted on a histogram, and counting the number of peaks in the histogram allows discrimination between different encoding mechanisms such as the popular Phase-Shift Keying (PSK) and Frequency Shift Keying (FSK) modulation schemes. A special case of the Daubechies and Haar wavelet, have been used extensively to recover these wavelet coefficients.

Figure 7:
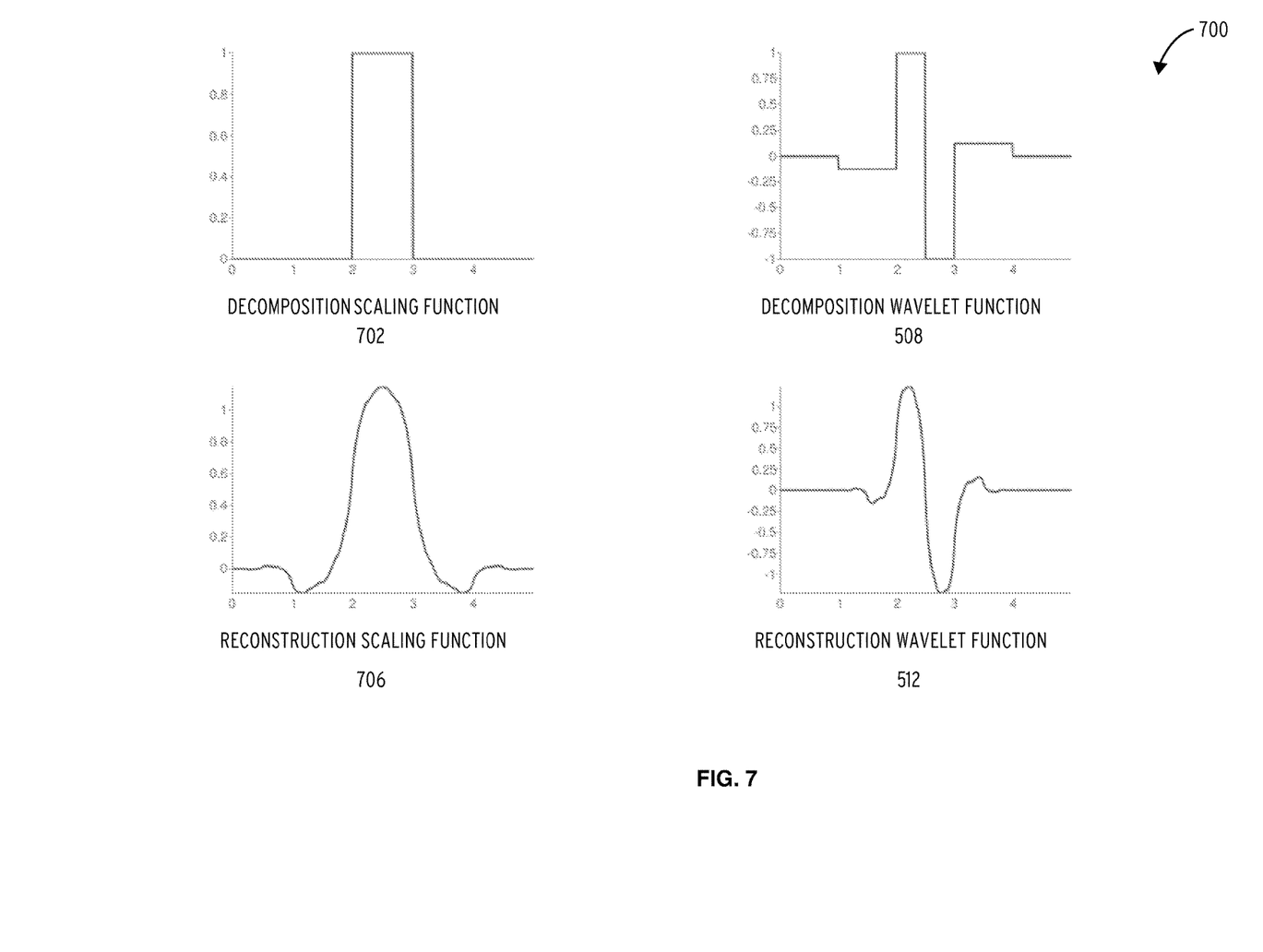
FIG. 7 illustrates an example of decomposition and reconstruction wavelet and scaling functions 700.

It is well-known that for feature extraction of images and biometric information, the Biorthogonal family of wavelet exhibits the property of linear phase, which is needed for signal decomposition and reconstruction. By using two wavelets FIG. 7, one for decomposition (on top) and the other for reconstruction (on bottom) instead of the same single one, properties suitable for ASD in the present system and method are derived.

Wavelets may be combined, using a "reverse, shift, multiply and integrate" technique called convolution, with portions of a known signal to extract information from the unknown signal. The Wavelet Transform (WT) provides a superior and flexible means of automatic modulation and demodulation system. With the WT, wavelet coefficients are attained by translating and dilating the time windows for a given resolution and are cross-correlated with the initial signal. With a WT, varied and vendor-specific non-stationary signals can be decomposed into classes of encoding to recover the digital information automatically. In addition, wavelets are localized in both time and frequency domains which allow for far more resolution than with any other methods.

For a person of ordinary skill in the art, the most intuitive type of wavelet transform to use may be the Discrete Wavelet Transform (DWT), as they may feel that the DWT is computationally more efficient at dealing with a finite set of data-points allowed by the use of filters. Despite the DWT's computational efficiency, however, it is generally unsuitable for current implementations of the system and method. Use of the DWT in this method causes skipped samples when cross-correlating the signals with any of the candidate wavelets and skipped samples when dilating candidate wavelets. Instead, a Continuous Wavelet Transform (CWT) function is used. A WT is a cross-correlation of a wavelet and a signal. Since most useful signals are gathered on a continuous time basis, the resulting wavelet is a form of a time-frequency approximation of a continuous-time (analog) signal. Another advantage in using a CWT is that it requires only the use of a single wavelet, instead of a wavelet and a scalet as with a DWT. Hence, a CWT is more suitable in this Automatic Signal Discovery (ASD) system and method as it preserves most of the signal content with wavelet coefficients at various levels of resolution, and provides a more complete representation of the convolution operation. On the other hand, a DWT is only suitable for de-noising and lossy compression of the original signal.

A hardware platform may be configured to automatically sense voltage and current levels, within a certain predetermined range, and then adapt its electronic circuitry to a given bandwidth to potentially detect a data stream and encoding mechanism. It is important to note that both the CWT and DWT are point-to-point discrete digital operations. They are both easy to compute with the use of a computer or specialized electronic hardware device (DSP, FPGA).

In one embodiment, the platform may be used for the discovery of physical encoding of communication data transferred between a commercial or household appliance and a remote control (external bus). The platform may interface with an existing analog electric system, and may assume that digital information might be encoded within this given analog system.

The system may passively monitor interconnection circuitry (between a given device and a its remote interface device). This communication link may be opened or closed (i.e. one of the device may or may not be connected to form a closed circuit). In the case of a closed circuit, the hardware platform connects as a parallel circuit, while minimizing the overall circuit impedance when connected to the bus. The electrical voltage (hence current) is quantized in an Analog to Digital Converter (ADC) and sampled at a given rate. The resulting digital information may be rendered as binary 1's and 0's. In all cases, the sampling period determines a time stamp for each sample and is stored. If the circuit is varying voltage or current on more than 1-wire (i.e. not ground, periodic or steady state level), a corresponding number of files per channel are generated which contain that particular channel ADC in the sampling order. Time information can be recovered by multiplying the sampling order to the sampling period.

The physical topologies may be based on different interfaces for both wired and wireless schemes, by way of example: bit-serial (1-, 2-, 3-, 4- and 5-wire), parallel (4-, 8-, 12- or 16-wire), and wireless radios. If the appliance and its remote control communicate wirelessly e.g. electromagnetic waves, optical, acoustics or mechanically, an appropriate transducer to correlate the carrier wave (which contains the digital information) to an electrical signal is used. Automatically recognized data streams are primarily serial asynchronous data transfer mechanisms based on actual binary data transfer modulated as shifting voltage, current and/or frequency levels.

Encoding schemes based on time modulation are also recognized if used as part of data transfer. Such time modulation may be based on a pulse width modulation (PWM), or pulse-duration modulation (PDM). In such cases, a direct correlation between the period and the clock basis of the signal yield a duty-cycle. The duty-cycle is transduced as binary numbers to represent the encoded data.

Digital Modulation Schemes

In a modern wired system, digital data may be modulated into an analog signal prior to transmission. It is fundamentally well understood how a wire carries electricity (using Ohm's Law, a signal can be encoded by modulating Voltage or Current). So, for the wired system encoding mechanisms discussed below, the modulation can use either voltage or current as the representative electromagnetic medium. Because current remains constant in any circuit loop (Kirchhoff's Law), current modulation is sometimes preferred over voltage. At any rate, the current can be deduced from the ensuing voltage as it passes through a known resistance.

It is known in the art that different encoding techniques are used depending on the application, and the medium used to transfer information. Often, the most cost-efficient method to arrive to good performance (signal-to-noise ratio) is sought. Each of the modulation scheme shown below carry a symbol from a family of $M=2^N$ symbols or bits.

The following encoding techniques (ASK, FSK, PSK, QAM) are well understood and widely used in the art and are used by way of example to explain the method for decoding both known and novel encoding mechanisms.

Amplitude Shift Keying (ASK) is a form of modulation which represents digital data as variations in the amplitude of a carrier wave:

$$s_i(t) = \begin{cases} A_i \sqrt{\frac{2E}{T}} \cos(2\pi f_c t), & 0 \le t \le T \\ 0, & \text{for all other } t \end{cases}$$

where $i \in N^*$ i.e $i=1, 2, 3, \ldots, A_i$ the signal amplitudes represent a vector of the binary symbols 1 or 0.

For BASK $i=1, 2$; hence 2 symbols encoding 0 and 1.
For a 4-ASK, 4 amplitudes encoding [00], [01], [10], [11] and so on . . . .

Equation 1: ASK Time-Domain Equation

Frequency Shift Keying (FSK): In Frequency Shift Keying, the change in frequency define different digital symbols.

$$s_i(t) = \begin{cases} \sqrt{\frac{2E}{T}} \cos(2\pi f_c t), & 0 \le t \le T \\ 0, & \text{for all other } t \end{cases}$$

Equation 2: FSK Time-Domain Equation

Phase Shift Keying (PSK): The phase of the carrier is discretely varied in relation either to a reference phase or to the phase of the immediately preceding signal element, in accordance with data being transmitted $$s_i(t) = \begin{cases} A_i \sqrt{\frac{2E}{T}} \cos(2\pi f_c t + \beta), & 0 \le t \le T \\ 0, & \text{for all other } t \end{cases}$$

where $$\beta = \frac{2\pi}{O}(i-1)O$$

denote order of the PSK signal.

When $i=1, 2, 3, 4$, the data symbol encoding [00], [01], [10], [11] respectively Equation 3: Other M-PSK Signals Quadratic Amplitude Modulation (QAM): is a modulation scheme where the amplitude of 2 waves of the same frequency, $\pi/2$ out-of-phase with each other are changed to represent the digital data:

$$s_i(t) = a_i \sqrt{\frac{2E}{T}} \cos(2\pi f_c t) + b_i \sqrt{\frac{2E}{T}}$$

where $a_i$ and $b_i$ represent the amplitude of in-phase and quadrature carriers.

Note that the carrier frequency remains constant.

Equation 4: M-QAM Signals

The template generation technique described below can be used to generate common-feature templates. It is important to note that a specific template is needed for any known digitally modulated signal. Because of PSK's simplicity over QAM, many wireless standards use it. The very successful QPSK IEEE 802.11b-1999 uses, for example, different PSK modulations for different data rates as required. It is also used in RFID, Bluetooth and others systems. PSK and 8-PSK are widely used in satellite broadcasting and Standard Definition satellite television signals. More complex systems, are still use a combination of QPSK and 8PSK such as DVB-S2 systems. The signal representation shown earlier under wired systems also applies for wireless systems.

Template Library Generation

Automatic Signal Discovery and Decoding are attained by the use of Wavelet Domain templates, which are used in the cross-correlation step of the ASD. The template generation is based on the fact that all digitally modulated communication signals of interest are sinusoidal in nature. This is defined as:

$$s_i(t) = A_c \cos(2\pi f_c t)$$

where $f_c$ is the carrier frequency and $A_c$ the carrier amplitude of the signal $s_i(t)$*

Equation 5: A Digitally Modulated Communication Signal

To enable a template to recognize temporal shifts of the carrier signal, a phase shift is introduced to the equation above as:

$$t_i(t) = A_c \cos(2\pi f_c t + \varphi), t_1 \le t \le t_2$$

where $\varphi$ is the phase shift of the signal $t_i(t)$

Equation 6: A Template Model for Detecting Signals which Modulate the Carrier Frequency to Transfer Data The above equation is the base model representing the decoding template in the time-domain. Using the signal definition as shown in eq. 1, 2, 3 and the template model shown in Equation 6, we can substitute the carrier frequency to compute, then store the cross-correlation values between them. The computation covers all the phase ranges $-\pi$ to $+\pi$. The template generation method generates at least 3 separate templates for a given modulation technique. It is accomplished by modulating the cosine and sine carrier wave with:

$\sigma=0$ 1st quadrant of the in-phase and quadrature (IQ)-plane, Modulation Template 1 610

$\sigma=\pi/2$ 2nd quadrant of IQ-plane, Modulation Template 2 614

$\sigma=5\pi/4$ 3rd quadrant of IQ-plane, Modulation Template 3 622

The wavelet cross-correlation with the different version of Equation 6 represents mathematically a combination of the I and Q basis functions.

By way of example, Template 1 represents the coordinates along with the different metrics relating to the cross-correlation values. It further allows the identification of the encoding mechanism and the transmitted symbol encoded in the signal. The wavelet may be selected such that the confidence level (closest constellation point) is high.

In the case where the modulation scheme is contained between cosine and phase-shifts to a sine carrier frequency on the IQ plane, $$\left(\cos(f(t) + \frac{\pi}{2}) = \sin f(t)\right)$$

only 2 templates (Template 1 618 and Template 2 620) based on the cosine and sine coordinates are used. This is possible because the temporal shifts of a signal in the time-domain correspond to the translation variable in the wavelet-domain. Hence, phase-shifts in the time domain have a time-shifting effect in the wavelet-domain.

Template 1 618 gives the I-axis coordinate, Template 2 620 gives the Q-axis. This allows describing with Template 1 BPSK signals directly. With Template 1 and 2, other M-ary PSK signals may be described. Template 1, 2 and 3 are used to identify and retrieve an 8-PSK signal. When more than 8 symbols are encoded in a Phase-Shift-Keying modulation scheme, it is well known that the signal-to-noise ratio increases to a point that there is significant data loss (Shannon-Hartley Theorem). In this case, other defining coordinate bound templates are needed to fully describe and locate the multiple bits sent by symbols. This can be understood as the symbol points on the signal constellation being much closer together, hence more susceptible to noise and other corruptions. Typically, those amplitude based encoding schemes such as the amplitude-shift keying (ASK) or quadratic-amplitude-modulation (QAM) will require Template 1 and additional templates.

Since QAM signals encode 2 digital bit streams by modulating the amplitudes of 2 out of phase signals (by $\pi/2$), the additional templates for QAM are not encoding the carrier frequency. If the frequency is changed along with phase and amplitude, then those signals would smear making decoding impossible.

$$q_1(t) = A_1 \cos(2\pi f_c t) + A_2 \cos(2\pi f_c t), \; t_i \leq t \leq t_{i+1}$$

$$q_2(t) = B_1 \cos(2\pi f_c t) + B_2 \cos(2\pi f_c t), \; t_i \leq t \leq t_{i+1}$$

$$q_3(t) = C_1 \cos(2\pi f_c t) + C_2 \cos(2\pi f_c t), \; t_i \leq t \leq t_{i+1}$$

$$q_4(t) = D_1 \cos(2\pi f_c t) + D_2 \cos(2\pi f_c t), \; t_i \leq t \leq t_{i+1}$$

where $A_1$, $A_2$, $B_2$, $C_1$, $C_2$, $D_1$ and $D_2$ depend on the location of the template on the signal constellation. The i index is the i-th transmitted symbol in the QAM transmission Equation 7: Base Templates for QAM Signals Describing Location in all 4 Quadrant of the IQ Plane In this case, the additional templates based on Equation 7, by way of example, are used to describe shifting square signal constellations. That is, the QAM signal size expands to cover the square area to enfold all the possible data symbol locations. The signal cross-correlations with Template 1 and 2 give an indication in which initial quadrant the signal symbol lie. The additional templates are used to identify on that square plane which symbol is being transmitted. It is a direct result that when the cross-correlation of the received signal with Template 1 and 2 are the same, that the signal is a QAM signal. Cross-correlating with the quadrant specific templates would indicate the QAM signal. This methodology may also be used in cases where the QAM signal is not evenly spaced and would require generating templates which would account for the Euclidean distances (x,y) between the points. The auto-correlation and cross-correlation results with such signals would quickly indicate whether it was evenly spaced or not.

A major advantage of this method over currently used techniques based on unique feature templates, is that for higher-order modulation schemes the number of required templates increases dramatically. Due to the larger constellation of points, more templates are required to properly detect the amplitude and phase changes. For example, a 256-QAM would require $2^{16}=65536$ templates when using a unique feature template method.

The system and method instead utilize common feature templates, which need at the very least 2 common feature templates and a maximum of 32 to fully represent all commonly used digital modulation schemes. The main benefit as opposed to the state-of-the art methods is a large reduction in computational complexity. Also, the WD cross-correlation data is much smaller and is effective in additional cross-correlation computations.

This method's use of the above common template library build for different carrier waves allows for numerical representation of all commonly used digital modulation schemes. As opposed to the state-of-the art methods, the disclosed method leads to reduced computational complexity and reliance on a single method to both recognize the modulation scheme and data stream decoding.

Additionally, the WD cross-correlation data is much smaller and is effective in the successive convolutions. The cross correlation values computed by the above template generation process are used for both the ASD and demodulation of the original signal.

CWT may be selected by computing the auto-correlation from a family of wavelets already in use in other techniques. The candidate wavelets are those producing a large magnitude changes in the CWT coefficients for our known modulation mechanisms. In, addition to the generated cross-correlation values, additional key information are computed. A statistical multi-level test of this data is obtained to further determine nuances in QAM modulation where the currently selected constellation quadrant may be expanding to widening constellation squares. This information is used in the ASD process.

$$Y_{ij} = \beta_{0j} + \beta_{1j} X_{ij} + e_{ij}$$

1-level regression $$\beta_{0j} = \gamma_{00} + \gamma_{01} W_j + v_{0j}$$

$$\beta_{1j} = \gamma_{10} + v_{1j}$$

2-level regression

Equation 8: Statistical Categorization

| Encoding System | Normalized Dynamic Range | Statistical Categorization |
|---|---|---|
| Template 1 | | |
| BASK | 0 to 5 | 0 |
| 4-ASK | 0 to 5 | 1 |
| BFSK | 0 to 5 | 0 |

-continued

| Encoding System | Normalized Dynamic Range | Statistical Categorization |
|---|---|---|
| 4-FSK | 0 to 5 | 0 |
| BPSK | −5 to 5 | 0 |
| QPSK | −5 to 5 | 2 |
| 8-PSK | −5 to 5 | 2 |
| 4-QAM | −5 to 5 | 0 |
| n-QAM ($2^n$, n = 2..4) | −5 to 5 | 3 |
| Template 2 | | |
| BASK | 0 to 5 | 0 |
| 4-ASK | 0 to 5 | 0 |
| BFSK | 0 to 5 | 0 |
| 4-FSK | 0 to 5 | 0 |
| BPSK | −5 to 5 | 0 |
| QPSK | −5 to 5 | 2 |
| 8-PSK | −5 to 5 | 2 |
| n-QAM ($2^n$, n = 1..4) | −5 to 5 | 3 |
| Template 3 | | |
| BASK | 0 to 5 | 0 |
| 4-ASK | 0 to 5 | 1 |
| BFSK | 0 to 5 | 0 |
| 4-FSK | 0 to 5 | 0 |
| BPSK | −5 to 5 | 0 |
| QPSK | −5 to 5 | 2 |
| 8-PSK | −5 to 5 | 2 |
| n-QAM ($2^n$, n = 1..4) | −5 to 5 | 3 |

Sample Modulation Scheme Selection Table for Popular Modulation Schemes

Data Decoding

The ASD technique may only be useful for digitally encoded baseband data. In Equation 6, the phase variable represents the shifting of the templates within an encoded symbol base. Data decoding is dependent on the discovered encoding mechanism since the shifting requires any combination of the generated templates.

Again, using the previously obtained normalized cross-correlation values between the templates and now known modulated signal, an process may be developed to decode the baseband bit stream.

The basis for the decoding process is the knowledge of the modulation signal transition in time and the resulting cross-correlation at those exact locations. The set of cross-correlation values obtained with our specially created templates, shows an absolute level of correlation confidence at a specific location for "1-encoded" bit transitioning to the next as shown on the constellation diagram in FIG. 8. The process also uses a set of threshold metrics to uniquely identify the concerned bit transition from a "1-encoded" value to the next. The bit transition grouping is dependent on the discovered encoding mechanism since some communication modulation encode more than 2 bits at any given time. For such systems, the process will use of additional cross-correlation values from the additional template to increase the number of recovered bits at each time location.

Figure 8:
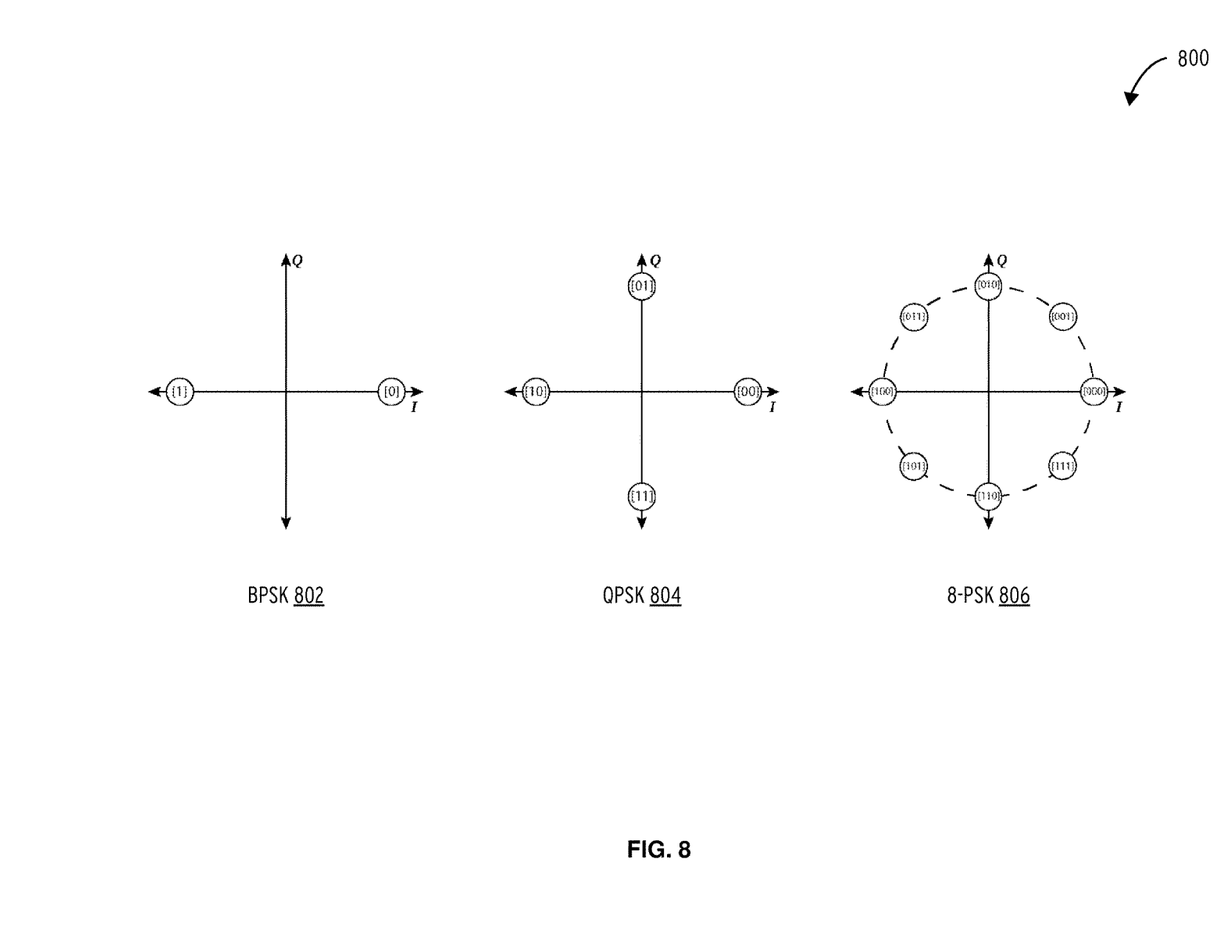
FIG. 8 illustrates constellation diagrams 800.

To recover the bit or bits encoded in a signal at time t (depending on the ASD output), we judiciously chose the following:

Modulation Template 1 maps to the constellation points on the I-axis and when M=1 (M number of symbols in signal), it is sufficient to recover the [0] or [1] (see in Word doc, template decoding, FIG. 8—BPSK). The choice filter is as simple as comparing the cross-correlation value from Modulation Template 1 to either be positive or negative to chose [0] and [1] respectively.

Modulation Template 2 maps to the constellation points on the I-axis and since it is a sine axis, the WD cross-correlation values need Modulation Template 1 for completing the number of symbols for when M=2, i.e, n=2^2=4-bits ([00], [01], [10], [11]) (QPSK 804). The choice filter follows the same logic as earlier. That is, if the cross-correlation value of Template 1 is positive and Template 2 is 0, then the signal recovered is [00], if the cross-correlation value of Template 1 is 0 and Template 2 is positive, then [01], if Template 1 value is negative, Template 2 is 0, then [10], finally if the value of Template 1 is 0 and Template 2 is negative then [11]

Modulation Template 3 maps to an even greater number of constellation points on the IQ-plane and require the use of the other 2 template. The choice filter for decoding follow a similar logic as earlier. The bits recovered for this operation where the number of symbols for M=3, is n=2^3=8-bit ([000] to [111]).

Finally when additional modulation template n are used, the same decoding logic applies using Template 1 as a base quadrant in the I-Q plane to search to the QAM constellation points matching the coordinate given by the cross-correlation. It may be faster to use auto-correlation with these additional templates and cross-correlate the value of Template 1 and Template 2 to compute the distance (Euclidean distance) between the points. These distances give a threshold indication used in the process to recover bits which lie inexactly in the constellation quadrant space.

Figure 6:
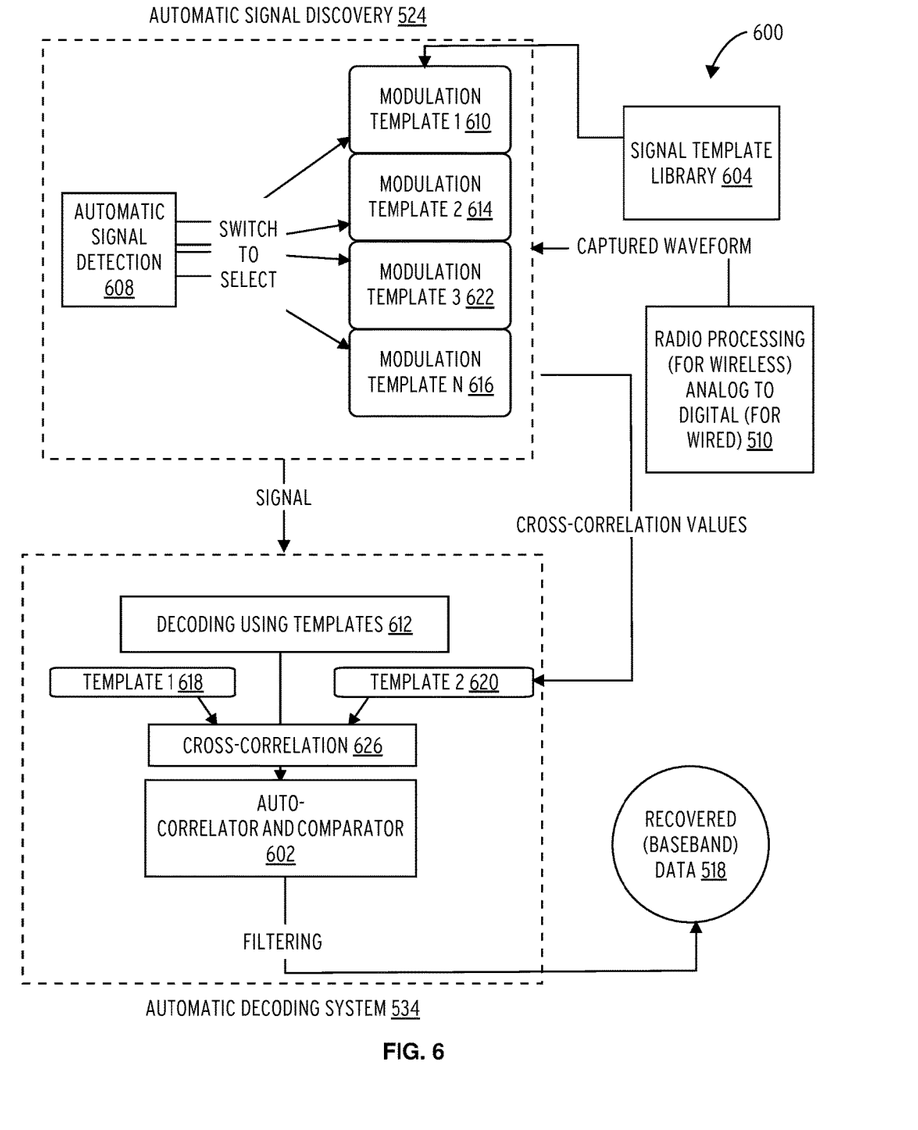
FIG. 6 illustrates an embodiment of automatic signal discovery and decoding 600

Pseudocode for Automatic Signal Modulation Discovery (FIG. 6)

1- Acquire signal from Analog to Digital System with unknown modulation scheme (In most cases, the sample rate must satisfy the Nyquist criteria. In the present process, data is oversampled by a larger factor)

2- Apply a Continuous Wavelet Transform (CWT) (in our case, we use the biorthogonal rbio1.3 wavelet)

3- Do n=1 to 3, select template(n) from the template library

4- Cross-correlate signal acquired in 1- with template(n) and obtain cross-correlation values 5- Normalize the cross-correlation values to have a dynamic range from −5 to 5 by taking the ratio between largest and smallest values (fixed dynamic range) and scaling.

6- Repeat 3- until all templates' cross-correlation are computed.

7- If the normalized cross-correlation values with Template 2 are all 0, or only positive, or only negative, then do 7-b, else do 7-a 7-a Based on the algebraic sign of the cross-correlation result, select the quadrant specific templates 7-b Use a random model intercept to compute the Y(i,j) where i and j are the templates taken together such that (i,j)=(1,2), (1,3) and (3,2) to determine if there exists is zero-valued (all 3 Y(i,j)=[0]), single level (2 of the 3 combination is 0) or multi-level relationship.

7-c Assign 0 for zero-valued, 1 for single valued, 2 for multi-level relationship.

8- Detect encoding mechanism based on classification table.

It is important to note that for classifying binary higher-order modulation schemes, additional templates are required following the same processes for detection and template generation. In step 7, cross correlation may not be sufficient to properly classify densely populated signals. Further, these higher order encoding mechanism are more susceptible to noise corruption and the sampling hardware needs to be adjusted.

General Decoding Process

1- Initialize a binary code string S which is ordered from left to right where the most significant bit is right-most.

2- Using the ASD results, the list of used templates, their respective cross-correlation data from the discovered signal 3- If ASD detected an M=1 modulation scheme (BPSK), then 3-a For each cross-correlation value from Template 1 (from ASD), use the BPSK decision filter to recover bits, add to S, do until all Template 1 cross correlation values have been filtered. Go to end 4- If ASD detected an M=2 modulation scheme (QPSK), then 4-a For each cross-correlation value from Template 1 and Template 2, use the QPSK decision filter to recover bits, add to S, do until all Template 1, 2 cross correlation values have been filtered. Go to end 5- If ASD detected an M=3 modulation scheme (8-PSK), then 5-a For each cross-correlation value from Template 1, 2, 3 use the 8-PSK decision filter to recover bits, add to S, do until all Template 1, 2, 3 cross correlation values have been filtered. Go to end 6- If ASD detected a 4-FSK, a total of 5 Templates are needed, Template 1, 4 and 5. Do, 6-a Use filter for M=1 (BPSK), for each cross-correlation of signal with Template 1, do 6-b If filter output is 0, then, if each cross correlation of Template 4 and 5 are both 0, add to S, [00], else 6-c Use filter following process given above (i.e., if T4>0 and T5=0, recover bit [01] etc. . . . ), add to S 6-c increment all indexes in cross correlation 6-d go to 6.

7- If ASD detected an BASK signal, for each cross correlation values with Template 1, use filter of 3- (i.e., if value=0, [0] and if value>0, [1]), add [0] or [1] to S, go to end 8- If ASD detected an M-ASK (now, data to be recovered is in the WD cross correlation values dynamic range)

8-a for each cross correlation dynamic range obtained with Template 1, create 4 range from 0 to the 5 and for each value falling in range 0, assign [00], range 1 [01], range 2 [10] and range 3 [11], add to S, next, go to end 9- If ASD detected M-QAM signal, additional templates where used (templates follow eq. 9)

9-a Determine IQ-plane from Template 1 and 2 cross-correlation values 9-b Using cross correlation data of template 3, use filter as in 3-

9-c For each auto-correlation values with largest template N (defining the widest square)

9-d For i=0 to M/4−1 do, 9-e Assign Threshold x(N−i) for Template (N−i) corresponding to symbol position i by computing the auto-correlation of each Template(N−i), next 9-f Filter according to: compare each cross-correlation from 9b and assign bit for symbol (number of bits (M/4), next, write bits into S 10- End.

Drawings

Figure 1:
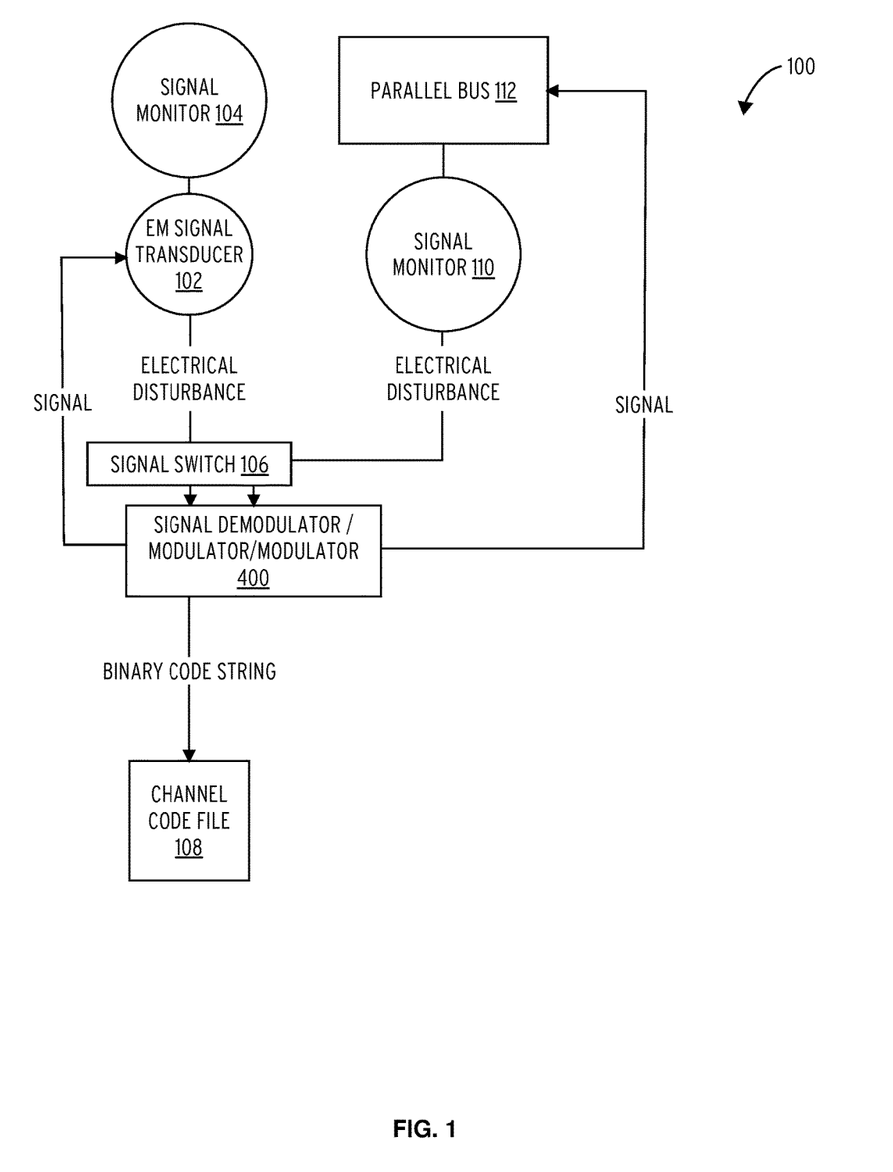
FIG. 1 illustrates an embodiment of a system for automatic electrical signal discovery and decoding 100.

The system for automatic electrical signal discovery and decoding 100 comprises an em signal transducer 102, a signal monitor 104, a signal monitor 110, a parallel bus 112, a signal switch 106, a signal demodulator/modulator/modulator 400, a filter buffer 114 (deleted), and a channel code file 108.

Figure 2:
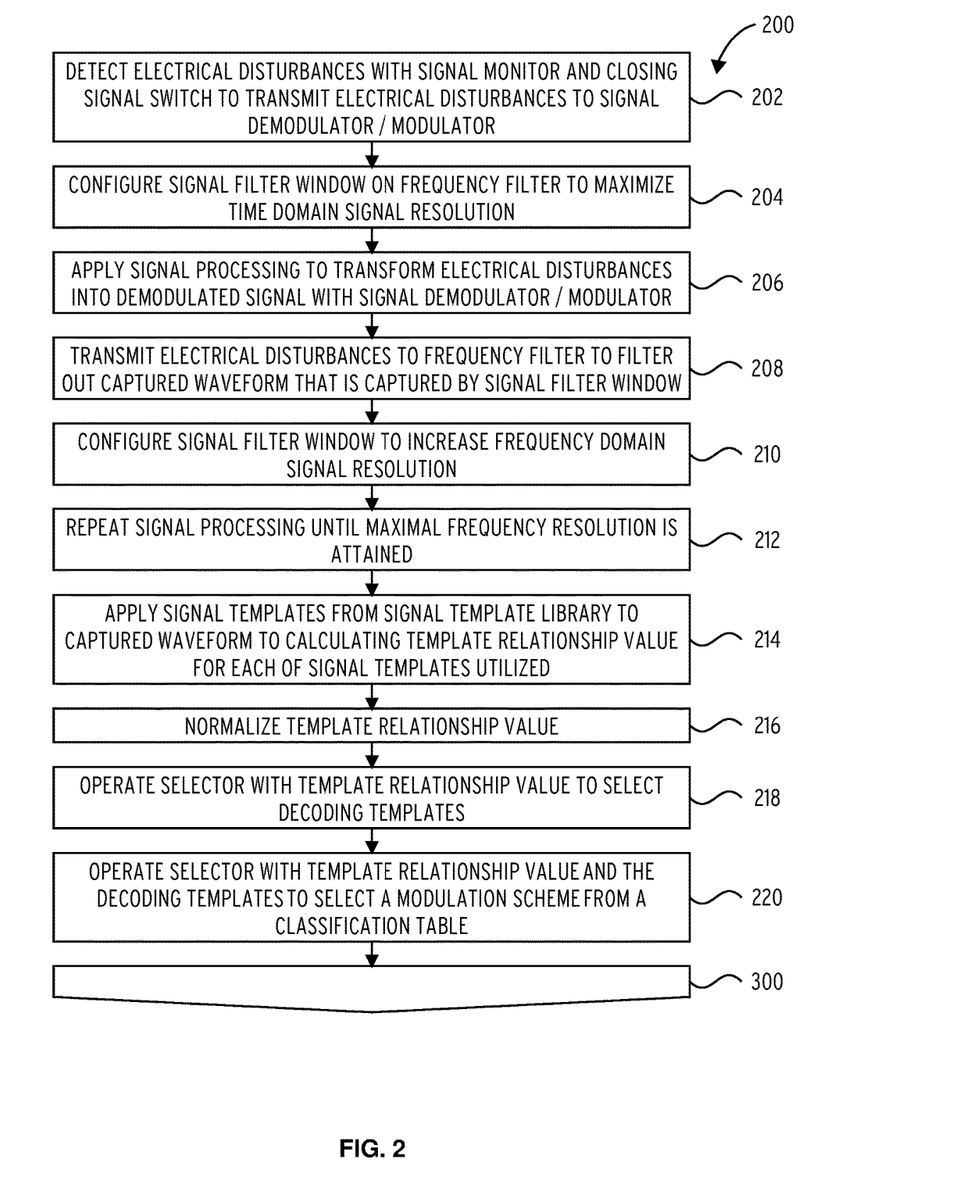
FIG. 2 illustrates a process for automatic electrical signal discovery and decoding 200.
Figure 3:
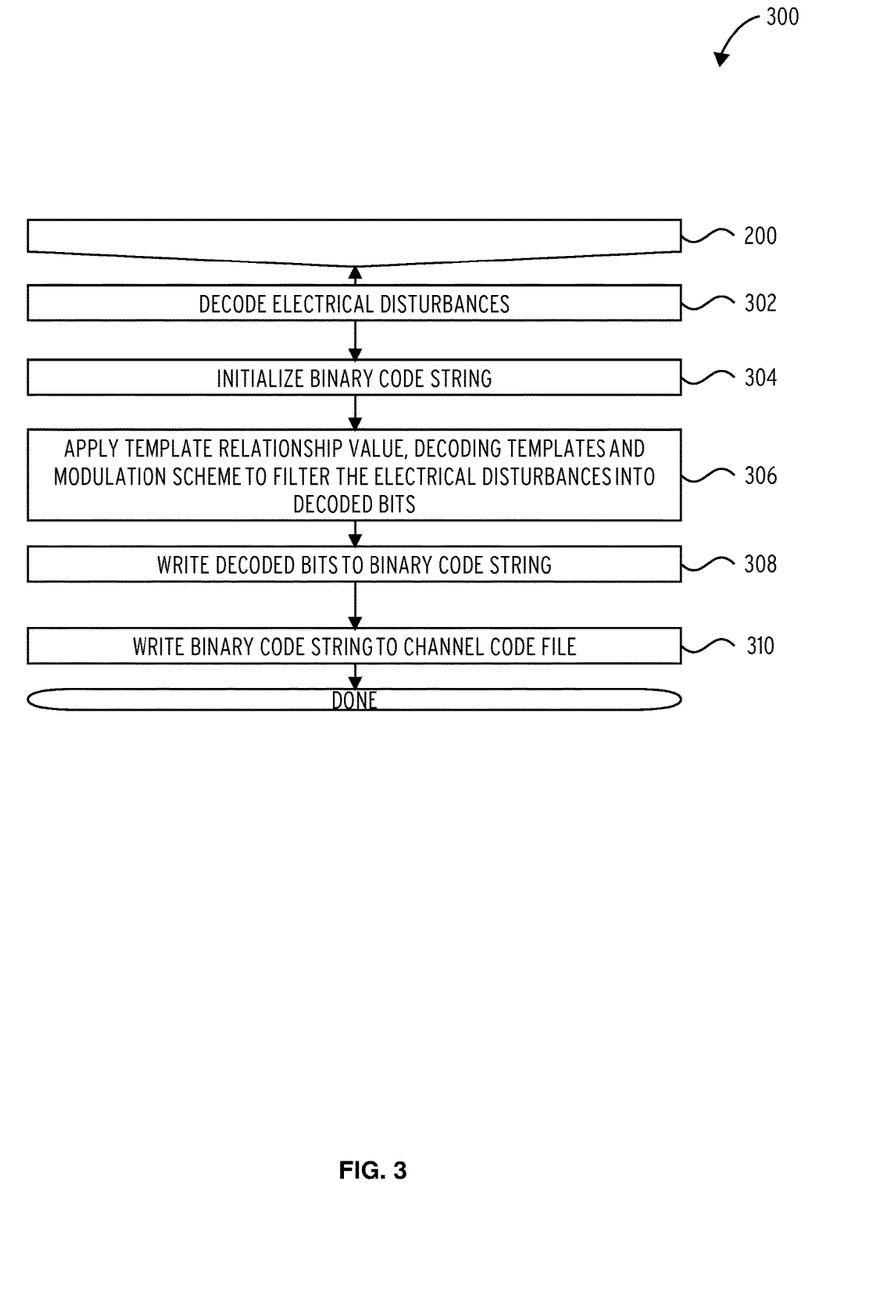
FIG. 3 illustrates an embodiment of a process for automatic electrical signal discovery and decoding 300.

The system for automatic electrical signal discovery and decoding 100 may be operated in accordance with the processes described in process for automatic electrical signal discovery and decoding 200, and process for automatic electrical signal discovery and decoding 300.

The signal monitor 104 and may be electromagnetic signal monitors.

Automatic Signal Modulation Discovery: This is the core system use to select the appropriate matching templates for family of encoding techniques. The ASD is also used in the feedback mechanism to generate the appropriate signal to be transmitted.

Demodulator/Modulator: The demodulator/modulator are the secondary core system in the ASD Referring to FIG. 2, in block 202, a process for automatic electrical signal discovery and decoding 200 detects electrical disturbances with a signal monitor and closes a signal switch to transmit the electrical disturbances to a signal demodulator/modulator. A signal filter window is configured on a frequency filter to maximize time domain signal resolution (block 204). Signal processing is applied to transform the electrical disturbances into a demodulated signal with the signal demodulator/modulator (block 206). The electrical disturbances are transmitted to the frequency filter to filter out a captured waveform that is captured by the signal filter window (block 208). The signal filter window is configured to increase frequency domain signal resolution (block 210). The signal processing is repeated until a maximal frequency resolution is attained (block 212). The signal templates from a signal template library are applied to the captured waveform to calculating a template relationship value for each of the signal templates utilized (block 214). The template relationship value is normalized (block 216). A a selector is operated with the template relationship value to select decoding templates (block 218). A selector is operated with the template relationship value, and the decoding templates to select a modulation scheme from a classification table (block 220).

Process for automatic electrical signal discovery and decoding 200 continues in process for automatic electrical signal discovery and decoding 300;

In block 302 process for automatic electrical signal discovery and decoding 300 decodes the electrical disturbances. A binary code string is initialized (block 304). The template relationship value, decoding templates and modulation scheme are applied to filter the electrical disturbances into decoded bits (block 306). The decoded bits are written to the binary code string (block 308). The binary code string is written to the channel code file (block 310).

This process provides more balanced resolution between In addition, this process is an improvement by requiring operational complexity closer to constant time than current processes, thereby reducing the usage of processor resources and thereby increasing system efficiency.

This process increases system efficiency and resource in several ways. By utilizing common feature templates, number of possible templates needed to demodulate higher-order signals is greatly reduced. For example, demodulation of a 256-QAM would require $2^{16}$ (65,536) templates when using the unique feature templates, while the instant method uses a maximum of 32 to represent all commonly used digital modulation schemes. This results in a substantial reduction in computational complexity.

In addition, the Wavelet Domain cross-correlation data is much smaller and is effective in the successive convolutions.

This methods use of the above common template library build for different carrier waves allows for numerical representation of all commonly used digital modulation schemes.

Figure 4:
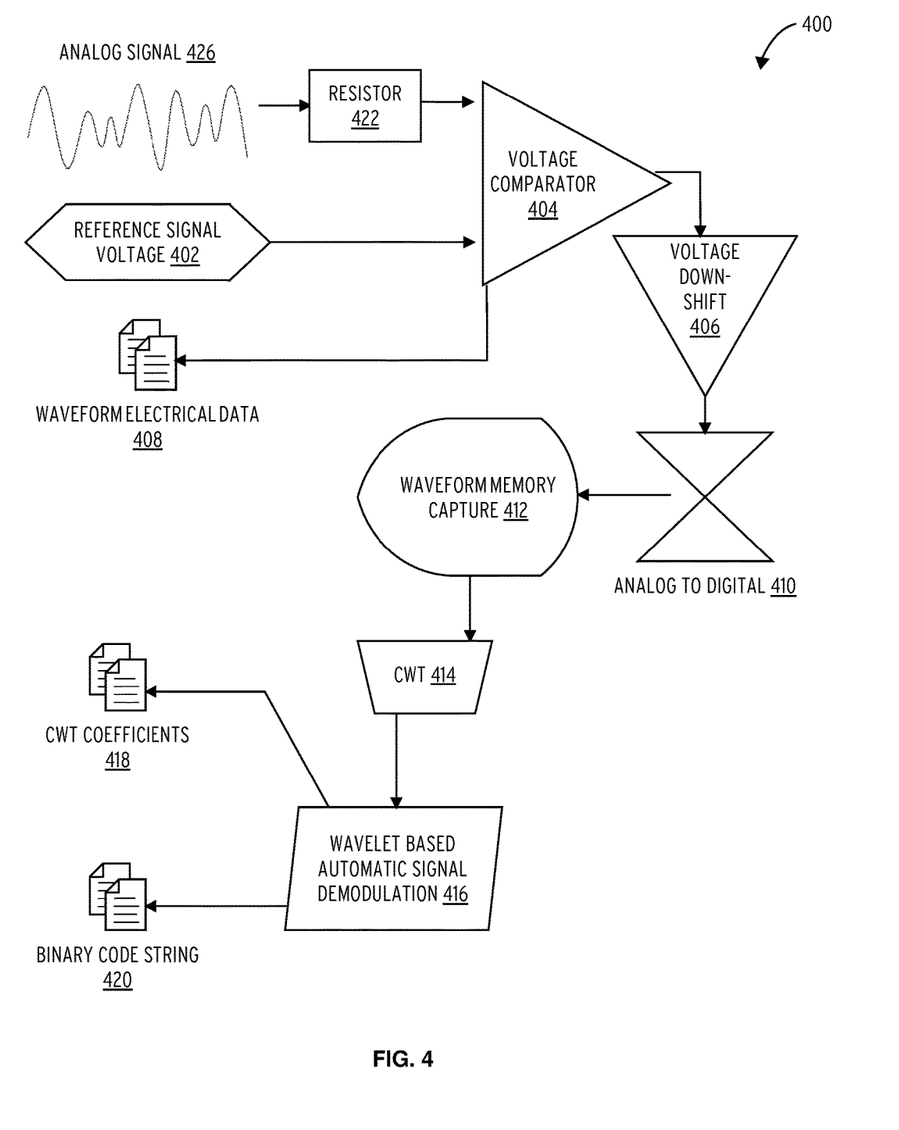
FIG. 4 illustrates an embodiment of a signal demodulator/modulator/modulator 400.

The signal demodulator/modulator/modulator 400 comprises analog signal 426, Resistor 422, reference signal voltage 402, waveform electrical data 408, voltage comparator 404, voltage down-shift 406, analog to digital 410, waveform memory capture 412, CWT 414, wavelet based automatic signal demodulation 416, CWT coefficients 418, and binary code string 420.

Analog signal 426 is routed through Resistor 422 and compared to reference signal voltage 402 and the waveform electrical data 408 is retrieved. A voltage down-shift 406 is then applied and the analog signal 426 is then converted to digital via analog to digital 410, logged in waveform memory capture 412 and CWT 414 is applied to process analog signal 426 via wavelet based automatic signal demodulation 416. CWT coefficients 418 and 320 are retrieved from the wavelet based automatic signal demodulation 416.

Figure 5:
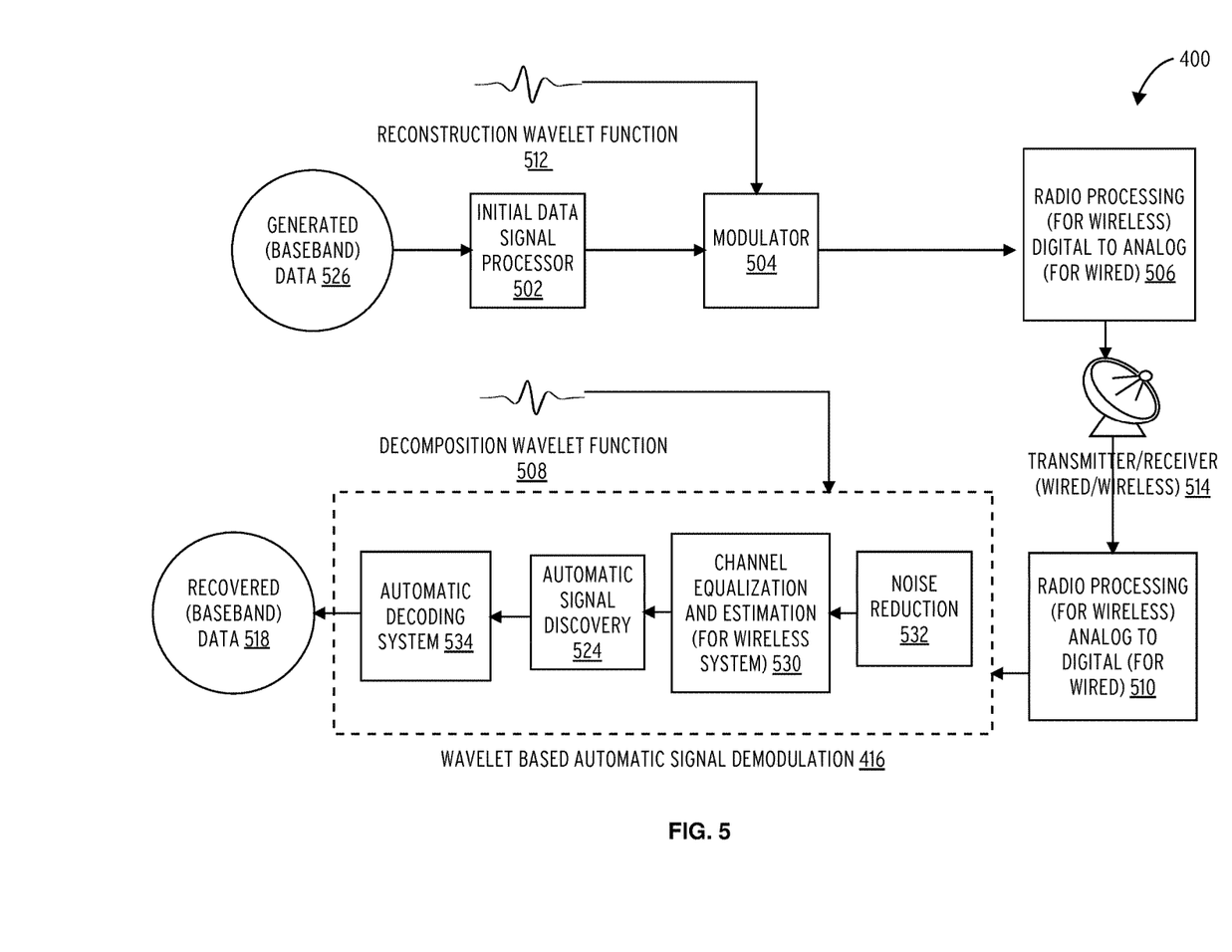
FIG. 5 illustrates an embodiment of a signal demodulator/modulator/modulator 400.

The signal demodulator/modulator/modulator 400 comprises generated (baseband) data 526, Initial Data signal processor 502, Modulator 504, Radio Processing (for wireless) Digital to Analog (for wired) 506, Transmitter/Receiver (wired/wireless) 514, Radio Processing (for wireless) Analog to Digital (for wired) 510, 412, noise reduction 532, channel equalization and estimation (for wireless system) 530, automatic signal discovery 524, automatic decoding system 534, recovered (baseband) data 518, Reconstruction wavelet function ψ 512, wavelet based automatic signal demodulation 416 and decomposition wavelet function ψ 508.

The automatic signal discovery and decoding 600 comprises automatic signal discovery 524, an automatic decoding system 534, Radio Processing (for wireless) Analog to Digital (for wired) 510, recovered (baseband) data 518, Automatic Signal Detection 608, Modulation Template 1 610, Modulation Template 2 614, Modulation Template 3 622, Modulation Template n 616, Decoding using Templates 612, Template 1 618, Template 2 620, cross-correlation 626, and auto-correlator and comparator 602.

Figure 9:
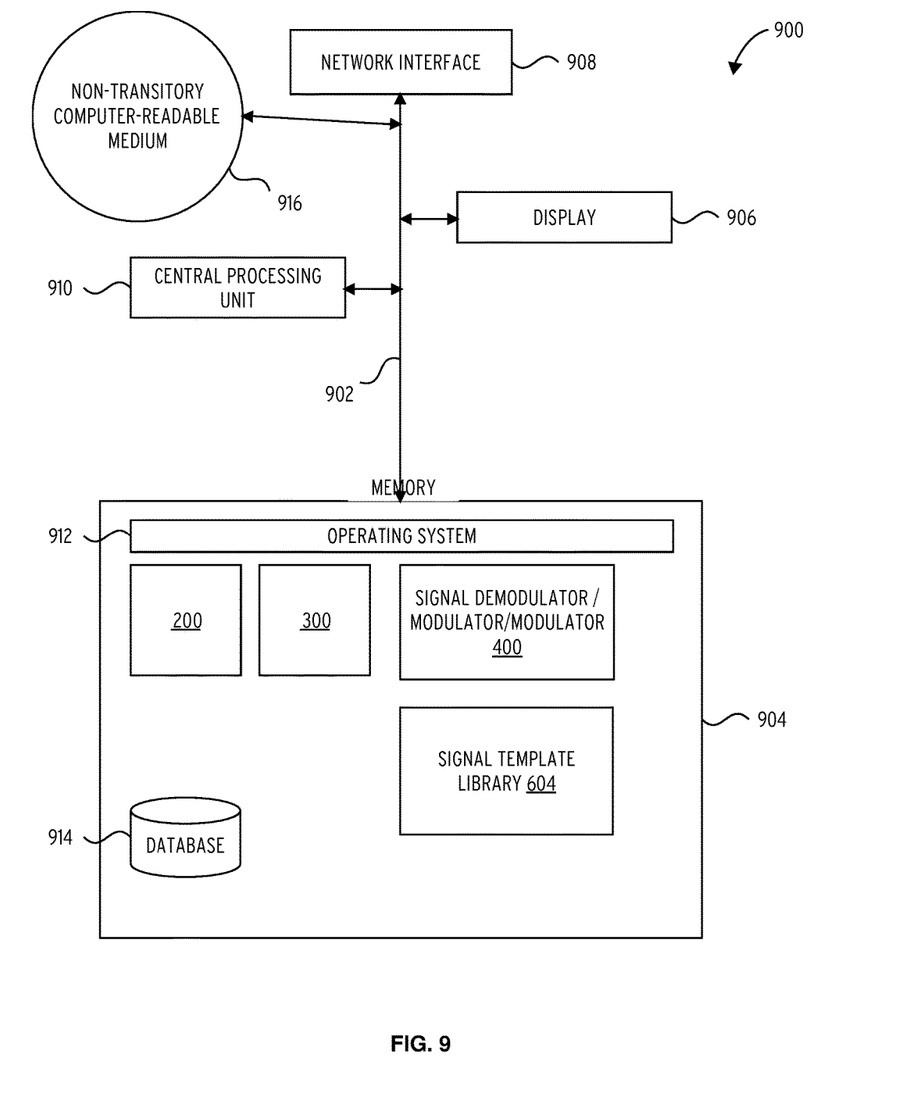
FIG. 9 illustrates an apparatus 300 in accordance with one embodiment.

FIG. 9 illustrates several components of an exemplary apparatus 900 in accordance with one embodiment. In various embodiments, apparatus 900 may include a desktop PC, server, workstation, mobile phone, laptop, tablet, set-top box, appliance, or other computing device that is capable of performing operations such as those described herein. In some embodiments, apparatus 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, apparatus 900 may comprise one or more physical and/or logical devices that collectively provide the functionalities described herein. In some embodiments, apparatus 900 may comprise one or more replicated and/or distributed physical or logical devices.

In some embodiments, apparatus 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Apparatus 900 includes a bus 902 interconnecting several components including a network interface 908, a display 906, a central processing unit 910, and a memory 904.

Memory 904 generally comprises a random access memory ("RAM") and permanent non-transitory mass storage device, such as a hard disk drive or solid-state drive. Memory 904 stores an operating system 912.

These and other software components may be loaded into memory 904 of apparatus 900 using a drive mechanism (not shown) associated with a non-transitory computer-readable medium 916, such as a floppy disc, tape, DVD/CD-ROM drive, memory card, or the like.

Memory 904 also includes database 914. In some embodiments, server 200 (deleted) may communicate with database 914 via network interface 908, a storage area network ("SAN"), a high-speed serial bus, and/or via the other suitable communication technology.

In some embodiments, database 914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method of operating a signal demodulator in a receiver device, the method comprising:
   operating the receiver device to receive a modulated signal;
   transform the modulated signal to a digital signal;
   configuring a signal filter window on a frequency filter to maximize time domain signal resolution;
   operating a signal processor to:
   (a) apply the digital signal to the frequency filter to filter out a captured waveform that is captured by the signal filter window;
   (b) re-configure the signal filter window to increase frequency domain signal resolution;
   (c) repeat (a) and (b) until a maximal frequency resolution is attained;
   applying signal templates from a signal template library to the captured waveform to calculate a template relationship value for each of the signal templates utilized;
   applying the template relationship value to select one or more decoding templates;
   applying the template relationship value and the one or more decoding templates to select a modulation scheme; and
   operating the signal demodulator to demodulate the digital signal using the template relationship value, the decoding templates and the modulation scheme.

2. The method of claim 1, further comprising:
   normalizing the template relationship value.

3. The method of claim 2, wherein demodulating the modulated signal further comprises:
   initializing a binary code string;
   applying the template relationship value, the decoding templates and the modulation scheme to filter the modulated signal into decoded bits;
   writing the decoded bits to the binary code string; and
   writing the binary code string to a channel code file.

4. The method of claim 1 wherein calculating the template relationship value further comprises computing a cross-correlation value by cross-correlating the captured waveform and the signal templates.

5. The method of claim 1, further comprising:
detecting the modulated signal with a signal monitor and closing a signal switch to transmit the modulated signal to an analog to digital converter by detecting electromagnetic disturbances with an electromagnetic signal monitor and transforming the electromagnetic disturbances into an electrical signal with an Electromagnetic (EM) signal transducer.

6. The method of claim 5, wherein the signal monitor detects electrical disturbances on multiple conductive lines in a parallel bus.

7. The method of claim 5, wherein the electromagnetic disturbances are fluctuations in voltage or current.

8. The method of claim 1, wherein the template relationship value comprises a cross-correlation value.

9. The method of claim 1, wherein the template relationship value comprises an algebraic sign and selecting the decoding templates further comprises utilizing an algebraic sign of the template relationship value to select the decoding templates.

10. The method of claim 1, wherein selecting the decoding templates further comprises using a random model intercept to determine if there exists a zero-valued, single level, or multi-level relationship.

11. A device comprising:
an interface to receive a modulated signal;
an analog-to-digital converter to convert the modulated signal to a digital signal;
at least one processor;
a memory comprising first instructions to operate the at least one processor to:
  (a) configure a signal filter window on a frequency filter to maximize time domain signal resolution;
  (b) apply the digital signal to the frequency filter to filter out a captured waveform that is captured by the signal filter window;
  (c) re-configure the signal filter window to increase frequency domain signal resolution;
  (d) repeat (b) and (c) until a maximal frequency resolution is attained;
  (e) apply signal templates from a signal template library to the captured waveform to calculate a template relationship value for each of the signal templates utilized;
  (f) apply the template relationship value to select one or more decoding templates;
  (g) apply the template relationship value and the one or more decoding templates to select a modulation scheme; and
  (h) demodulate the digital signal using the template relationship value, the decoding templates and the modulation scheme.

12. The device of claim 11, further comprising:
normalizing the template relationship value.

13. The device of claim 12, wherein demodulating the digital signal further comprises:
initializing a binary code string;
applying the template relationship value, the decoding templates and the modulation scheme to filter the digital signal into decoded bits;
writing the decoded bits to the binary code string; and
writing the binary code string to a channel code file.

14. The device of claim 11 wherein calculating the template relationship value further comprises computing a cross-correlation value by cross-correlating the captured waveform and the signal templates.

15. The device of claim 11, further comprising:
detecting the modulated signal with a signal monitor and closing a signal switch to transmit the modulated signal to the analog-to-digital converter by detecting an electromagnetic disturbance with an electromagnetic signal monitor and transforming the electromagnetic disturbance into an electrical signal with an Electromagnetic (EM) signal transducer.

16. The device of claim 15, wherein the signal monitor detects electrical disturbances on multiple conductive lines in a parallel bus.

17. The device of claim 11, wherein the template relationship value comprises a cross-correlation value.

18. The device of claim 11, wherein the template relationship value comprises an algebraic sign and selecting the decoding templates further comprises utilizing an algebraic sign of the template relationship value to select the decoding templates.

19. The device of claim 11, wherein selecting the decoding templates further comprises using a random model intercept to determine if there exists a zero-valued, single level, or multi-level relationship.

* * * * *